United States Patent
Lewandowski et al.

(10) Patent No.: US 12,511,401 B2
(45) Date of Patent: Dec. 30, 2025

(54) ON-DEMAND APPLICATION VULNERABILITY SCANNING

(71) Applicant: International Business Machines Corporation, Armonk, NY (US)

(72) Inventors: Marcin Lewandowski, Cracow (PL); Krzysztof Rudek, Nowy Wisnicz (PL)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 17/653,589

(22) Filed: Mar. 4, 2022

(65) Prior Publication Data

US 2023/0281316 A1    Sep. 7, 2023

(51) Int. Cl.
*G06F 21/00* (2013.01)
*G06F 21/55* (2013.01)
*G06F 21/56* (2013.01)
*G06F 21/57* (2013.01)

(52) U.S. Cl.
CPC .......... *G06F 21/577* (2013.01); *G06F 21/554* (2013.01); *G06F 21/566* (2013.01)

(58) Field of Classification Search
CPC ...... G06F 21/54; G06F 21/554; G06F 21/566; G06F 21/577; G06F 21/64; G06F 21/57
See application file for complete search history.

(56) References Cited

U.S. PATENT DOCUMENTS

| | | | |
|---|---|---|---|
| 9,152,795 B2 * | 10/2015 | Laverdière-Papineau | G06F 21/54 |
| 10,691,810 B1 * | 6/2020 | Freitag | G06F 8/71 |
| 10,764,244 B1 * | 9/2020 | Mestery | H04L 63/0281 |
| 10,769,250 B1 * | 9/2020 | Tautschnig | G06F 21/577 |
| 11,175,897 B1 * | 11/2021 | Deng | G06F 8/51 |
| 11,632,251 B1 * | 4/2023 | Manning | H04L 9/3297 713/176 |

(Continued)

FOREIGN PATENT DOCUMENTS

| | | | | |
|---|---|---|---|---|
| CA | 3078935 C | * | 8/2023 | G06F 8/60 |
| CN | 111783104 B | | 4/2021 | |

(Continued)

OTHER PUBLICATIONS

Matthieu Jimenez et al, "Enabling the Continuous Analysis of Security Vulnerabilities with VulData7," 2018 IEEE 18th International Working Conference on Source Code Analysis and Manipulation (SCAM), IEEE, dated Nov. 12, 2018, pp. 1-6.

(Continued)

*Primary Examiner* — Don G Zhao
(74) *Attorney, Agent, or Firm* — Patterson + Sheridan, LLP

(57) ABSTRACT

Certain aspects of the present disclosure provide techniques for identifying and resolving security vulnerabilities in a software application build. This includes identifying a change for a dependency in a software application build based on analyzing a commit to a first repository for the build, storing an entry in a second repository reflecting the change for the dependency, and parsing the second repository to identify the change for the dependency. It further includes determining that the change reflects a security vulnerability for the dependency, and in response updating the second repository to identify the security vulnerability, and performing an action to cure the security vulnerability for the software application build.

14 Claims, 7 Drawing Sheets

(56) References Cited

U.S. PATENT DOCUMENTS

| | | | | |
|---|---|---|---|---|
| 12,093,676 | B2* | 9/2024 | Basu | G06F 8/71 |
| 2011/0161288 | A1* | 6/2011 | Morimoto | G06F 16/2343 |
| | | | | 707/611 |
| 2015/0089478 | A1* | 3/2015 | Cheluvaraju | G06F 8/72 |
| | | | | 717/123 |
| 2016/0188882 | A1* | 6/2016 | Mahrous | G06Q 50/00 |
| | | | | 726/25 |
| 2016/0350692 | A1* | 12/2016 | Doganata | G06Q 10/06398 |
| 2017/0169229 | A1* | 6/2017 | Brucker | G06F 21/566 |
| 2017/0364354 | A1* | 12/2017 | Masis | G06F 8/71 |
| 2018/0095736 | A1* | 4/2018 | Gao | G06F 8/4441 |
| 2018/0189497 | A1* | 7/2018 | Sukhomlinov | G06F 21/50 |
| 2018/0260312 | A1* | 9/2018 | Strachan | G06F 8/71 |
| 2018/0285572 | A1* | 10/2018 | Hanner | G06F 21/577 |
| 2019/0318366 | A1* | 10/2019 | Carranza | G06N 3/08 |
| 2020/0117807 | A1* | 4/2020 | Nadgowda | G06F 8/65 |
| 2020/0202006 | A1* | 6/2020 | Shah | G06F 8/77 |
| 2020/0202007 | A1* | 6/2020 | Nagaraja | G06F 11/3684 |
| 2020/0210590 | A1* | 7/2020 | Doyle | G06F 21/577 |
| 2020/0228560 | A1* | 7/2020 | Murthy | G06F 8/65 |
| 2020/0349055 | A1* | 11/2020 | Reddy | G06F 11/3688 |
| 2020/0358802 | A1* | 11/2020 | Viswambharan | G06F 9/5072 |
| 2020/0394309 | A1* | 12/2020 | Angelo | H04L 9/3297 |
| 2021/0004314 | A1* | 1/2021 | Emek | G06F 11/3616 |
| 2021/0019423 | A1* | 1/2021 | DuBois | G06F 21/552 |
| 2021/0073107 | A1 | 3/2021 | Sharma | |
| 2021/0133326 | A1* | 5/2021 | Wu | G06F 21/577 |
| 2021/0141635 | A1 | 5/2021 | Thomas et al. | |
| 2021/0271586 | A1* | 9/2021 | Emek | G06F 11/3684 |
| 2022/0311794 | A1* | 9/2022 | Maya | G06F 11/0766 |
| 2022/0321608 | A1* | 10/2022 | Pogorelik | H04L 63/205 |
| 2022/0391189 | A1* | 12/2022 | Padubidri | G06F 8/71 |
| 2023/0097733 | A1* | 3/2023 | Nelson | G06F 21/577 |
| | | | | 726/25 |
| 2023/0122397 | A1* | 4/2023 | Sathyamoorthy | G06F 9/451 |
| | | | | 717/130 |
| 2023/0176961 | A1* | 6/2023 | Hong | G06F 11/079 |
| | | | | 717/124 |
| 2023/0224376 | A1* | 7/2023 | Little | H04L 67/562 |
| | | | | 709/230 |
| 2024/0004638 | A1* | 1/2024 | Zhou | G06N 3/0455 |

FOREIGN PATENT DOCUMENTS

| | | | | |
|---|---|---|---|---|
| EP | 3671512 A1 | * | 6/2020 | G06F 21/57 |
| JP | 2019139522 A | * | 8/2019 | G06F 11/008 |

OTHER PUBLICATIONS

HCL Software, "Fast, Accurate, Agile," HCL Technologies, Year: 2021, pp. 1-4.

OWASP, "OWASP Dependency-Check," The OWASP Foundation, Accessed: Oct. 11, 2021, pp. 1-3.

Snyk, "Developer Security: Develop fast. Stay Secure," Date Accessed: Oct. 11, 2021, pp. 1-10.

Guide to GitOps, Weaveworks, Jan. 20, 2022, 19 pages, doi: https://www.weave.works/technologies/gitops/.

No Author, "NVD Data Feeds", https://nvd.nist.gov/vuln/data-feeds, Sep. 20, 2022, 4 pages.

* cited by examiner

ON-DEMAND APPLICATION VULNERABILITY SCANNING

BACKGROUND

The present disclosure relates to computer security, and more specifically, to identifying and resolving security vulnerabilities in a software application build.

SUMMARY

Embodiments include a method. The method includes identifying a change for a dependency in a software application build based on analyzing a commit to a first repository for the build. The method further includes storing an entry in a second repository reflecting the change for the dependency. The method further includes parsing the second repository to identify the change for the dependency. The method further includes determining that the change reflects a security vulnerability for the dependency, and in response updating the second repository to identify the security vulnerability, and performing an action to cure the security vulnerability for the software application build.

Embodiments further include a system. The system includes a computer processor and a memory having instructions stored thereon which, when executed on the computer processor, performs operations. The operations include identifying a change for a dependency in a software application build based on analyzing a commit to a first repository for the build. The operations further includes storing an entry in a second repository reflecting the change for the dependency. The operations further include parsing the second repository to identify the change for the dependency. The operations further include determining that the change reflects a security vulnerability for the dependency, and in response updating the second repository to identify the security vulnerability, and performing an action to cure the security vulnerability for the software application build.

Embodiments further include a computer program product. The computer program product a computer-readable storage medium having computer-readable program code embodied therewith, the computer-readable program code executable by one or more computer processors to perform operations. The operations include identifying a change for a dependency in a software application build based on analyzing a commit to a first repository for the build. The operations further includes storing an entry in a second repository reflecting the change for the dependency. The operations further include parsing the second repository to identify the change for the dependency. The operations further include determining that the change reflects a security vulnerability for the dependency, and in response updating the second repository to identify the security vulnerability, and performing an action to cure the security vulnerability for the software application build.

DETAILED DESCRIPTION

Figure 1:
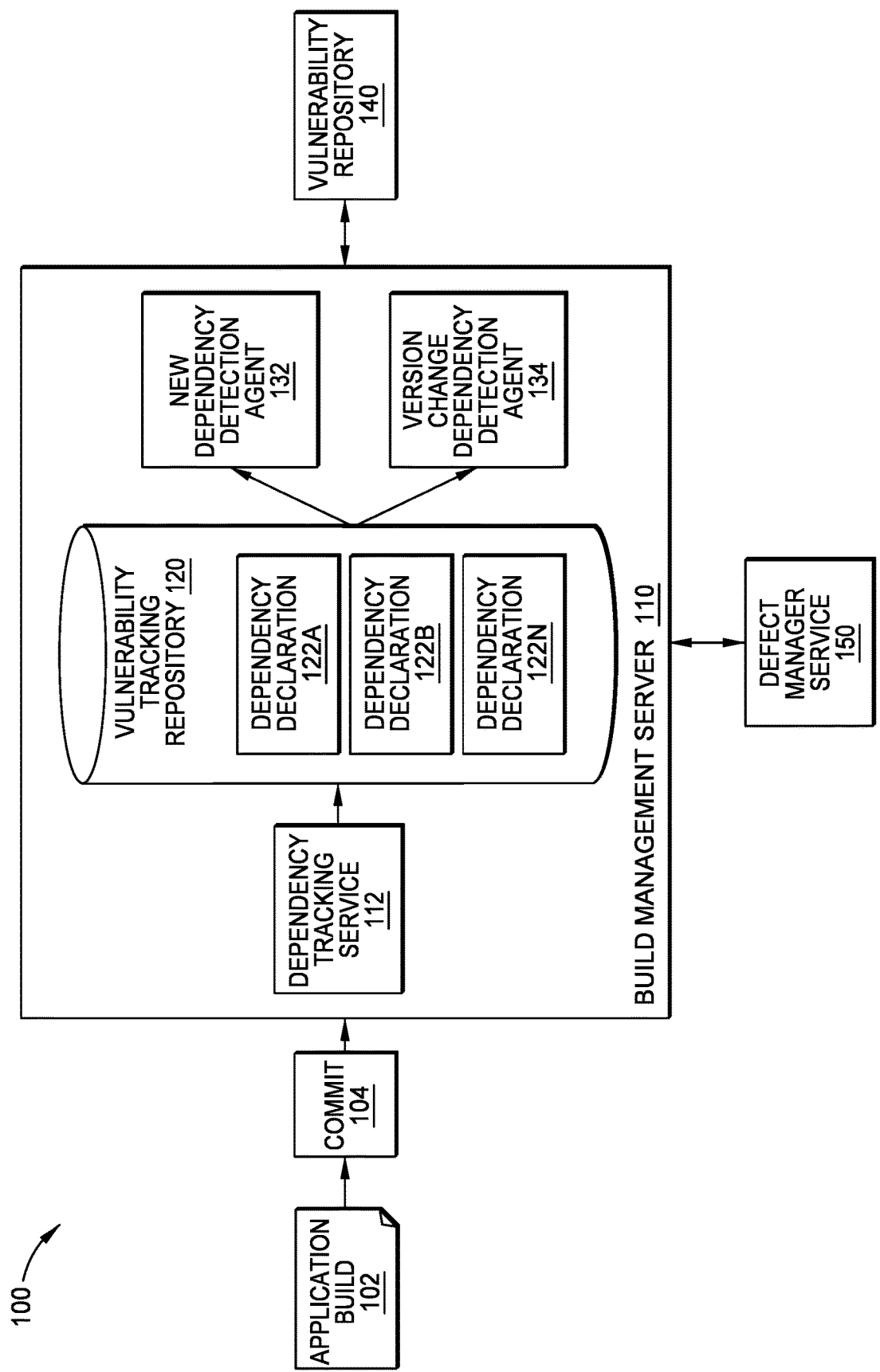
FIG. 1 illustrates a computing environment for identifying and resolving security vulnerabilities in a software application build, according to one embodiment.

Many software enterprises take steps to continuously ensure the software they develop and maintain is free of security vulnerabilities. This often includes investigating security vulnerabilities by ensuring there are no security vulnerabilities in the libraries and runtimes that are part of the software application dependencies. For example, dependency vulnerabilities can be discovered using static scans that inspect an application to generate a list of dependencies in use (e.g., by name and version), and then compare the list against a vulnerability database (e.g., the National Vulnerability Database (NVD)). The result of running the scanner can be a vulnerability report (e.g., a document that lists all vulnerabilities found per dependency). Further, the scanner can integrate with issue tracking systems (e.g., used by a testing or quality assurance team for the software application) to automatically create submissions for found vulnerabilities.

This approach, however, lacks scalability. Because new vulnerabilities can appear any time, the scan utilities must run frequently to identify vulnerabilities. This can be very computationally expensive for larger applications or application systems, requiring significant computational resources and wasting power.

In an embodiment, identification of security vulnerabilities (e.g., for dependencies in a software application build) can instead be done as part of a regular software development pipeline (e.g., a continuous integration (CI) pipeline). Specialized software agents (e.g., pipelines) can be integrated with a build management tool to listen for relevant events, including the addition of new dependencies, version changes in dependencies, and the identification of new security vulnerabilities for dependencies (e.g., in the NVD or another suitable repository). For example, software agents can review commits to a source control database or another build tool, and identify events arising out of the commits.

This has many advantages, including reducing the number of repetitive scans. For example, instead of repeatedly scanning the same dependency identification information for vulnerabilities (e.g., by name and version number), one or more techniques disclosed herein can identify events that require further analysis as they occur. Further, a list of found vulnerabilities can be directly integrated with a build management tool, instead of requiring specialized applications for displaying and storing scan reports. One or more techniques disclosed herein allow an administrator or quality assurance engineer to keep and view the history of vulnerability findings and apply fixes over time. Finally, one or more of these techniques are easily extensible. An administrator or engineer can readily add a new pipeline to watch for build events (e.g., commits to a source control database) and take actions upon identifying the events (e.g., creating a submission in an issue tracking system, or closing a submission automatically upon fix).

FIG. 1 illustrates a computing environment 100 for identifying and resolving security vulnerabilities in a software application build, according to one embodiment. The computing environment 100 includes an application build 102. In an embodiment, the application build 102 includes files describing build operations for a software application. For example, the application build 102 can include a description of source code files to include in the build, library files to include in the build, runtime files to include in the build, and any other suitable files to include in the build. The application build 102 can include a listing of dependencies used by the software application build. This can include libraries and runtimes used by the build, along with any other suitable dependencies. Further, the application build 102 can describe steps to undertake to build the application (e.g., compilation, retrieval of libraries, etc.). In an embodiment, the application build 102 further includes source code files themselves, library files, runtime files, and any other suitable build information.

In an embodiment, the application build 102 is managed by a build management server 110, which includes a vulnerability tracking repository 120 (e.g., a source control repository). A change to the application build 102 is committed (e.g., propagated to a source control repository), generating a commit 104. The commit 104 is transmitted to the build management server 110. In an embodiment, the application build 102 is maintained on the build management server 110, and the commit 104 is transmitted to the vulnerability tracking repository 120 on the build management server 110.

Alternatively, or in addition, the application build 102 is maintained remotely from the build management server 110 (e.g., on an additional source code repository, a test environment, or another suitable location). In this embodiment the commit 104 is transmitted to the build management server 110 using a suitable network connection, including a wireless connection (e.g., a Wi-Fi® connection or a cellular connection) or a wired connection (e.g., and Ethernet connection) using a suitable communication network (e.g., the Internet, a local area network (LAN), a wide area network (WAN), or a cellular network). Further, in an embodiment, the build management server 110 is in communication with a source control repository including source code and build files for the application build 102. For example, the build management server 110 can maintain a source control repository, or can communicate with a remote source control repository (e.g., using a suitable communication network).

As illustrated, the build management server 110 includes a dependency tracking service 112. In an embodiment, the dependency tracking service 112 analyzes the commit 104 to identify changes to dependencies. For example, the dependency tracking service 112 can parse files in the commit 104 (e.g., a changelog), can parse files identified by the commit 104 (e.g., application build files), or can analyze any other suitable information. The dependency tracking service 112 can identify new dependencies added to the application build 102 (e.g., added by the commit 104) or changes to dependencies in the application build 102 (e.g., new versions of dependencies in the application build 102).

In an embodiment, the dependency tracking service 112 commits changes to the vulnerability tracking repository 120 identifying the dependency changes. For example, the dependency tracking service can add, or modify, dependency declarations 122A-N in the vulnerability tracking repository. The dependency declarations 122A-N can identify libraries, or runtimes, which the application build 102 depends on (e.g., third party libraries or runtimes). This is discussed further below with regard to FIGS. 3-5.

In an embodiment, the vulnerability tracking repository 120 is a suitable source code repository, and the dependency declarations 122A-N are files stored in the source code repository that identify the dependencies. For example, the dependency declarations 122A-N can be individual files that identify the name and version number for dependencies used by the application build 102, can be entries in one or more files that identify the name and version number of dependencies, or can take any other suitable form.

The build management server 110 further includes a new dependency detection agent 132, to detect vulnerabilities arising from new dependencies added to the application build 102. In an embodiment, the new dependency detection agent 132 listens for changes to the vulnerability tracking repository 120 (e.g., new dependency declarations 122A-N) and identifies any vulnerabilities associated with the new dependencies. This is discussed further below with regard to FIGS. 3-5.

In an embodiment, the build management server 110 further includes a version change dependency detection agent 134. In an embodiment, the version change dependency detection agent 134 listens for changes to the vulnerability tracking repository 120 (e.g., changes to the dependency declarations 122A-N identifying new versions of the dependencies) and identifies any vulnerabilities associated with the new versions of the dependencies. This is discussed further below with regard to FIGS. 3-5.

In an embodiment, the build management server 110 (e.g., the new dependency detection agent 132, the version change dependency detection agent 134, or both) interacts with a vulnerability repository 140 to identify vulnerabilities in the dependency declarations 122A-N. For example, the vulnerability repository 140 can be a central repository identifying known security vulnerabilities in various libraries and runtimes. The vulnerability repository 140 can be maintained by a central authority (e.g., the NVD maintained by the U.S. government), by the entity maintaining the application build 102, or by any other suitable entity or combination of entities.

In an embodiment, the build management server 110 (e e.g., the new dependency detection agent 132, the version change dependency detection agent 134, or both) further interacts with a defect manager service 150. For example, the new dependency detection agent 132, the version change dependency detection agent 134, or both, can identify vulnerabilities associated with one or more of the dependency declarations 122A-N. The respective agent 132 or 134 can provide these identified vulnerabilities to the defect manager service 150. The defect manager service 150 can then take steps to resolve the vulnerabilities. For example, the defect manager service 150 can provide the vulnerabilities to a suitable administrator or engineer, or can generate a ticket in suitable database (e.g., a product development bug database).

As another example, the defect manager service 150 can take steps to automatically resolve the vulnerability. For example, the defect manager service 150 can identify a more recent version of the dependency with the vulnerability (e.g., using the vulnerability repository 140, through an Internet search, or using any other suitable technique). The defect manager service 150 can automatically download the more recent version of the dependency, and can provisionally update the application build 102 to include the more recent version or generate a suggestion for an administrator or engineer to include the more recent version of the dependency in the application build 102.

While the build management server 110 is illustrated as a single entity, in an embodiment, the various components can be implemented using any suitable combination of physical services, cloud compute nodes and storage locations, or any other suitable implementation. For example, the build management server 110 could be implemented using a server or cluster of servers (e.g., maintained by the application developer). As another example, the build management server 110 can be implemented using a combination of compute nodes and storage locations in a suitable cloud environment. For example, one or more of the components of the build management server 110 can be implemented using a public cloud, a private cloud, a hybrid cloud, on premises cluster, or any other suitable implementation.

Figure 2:
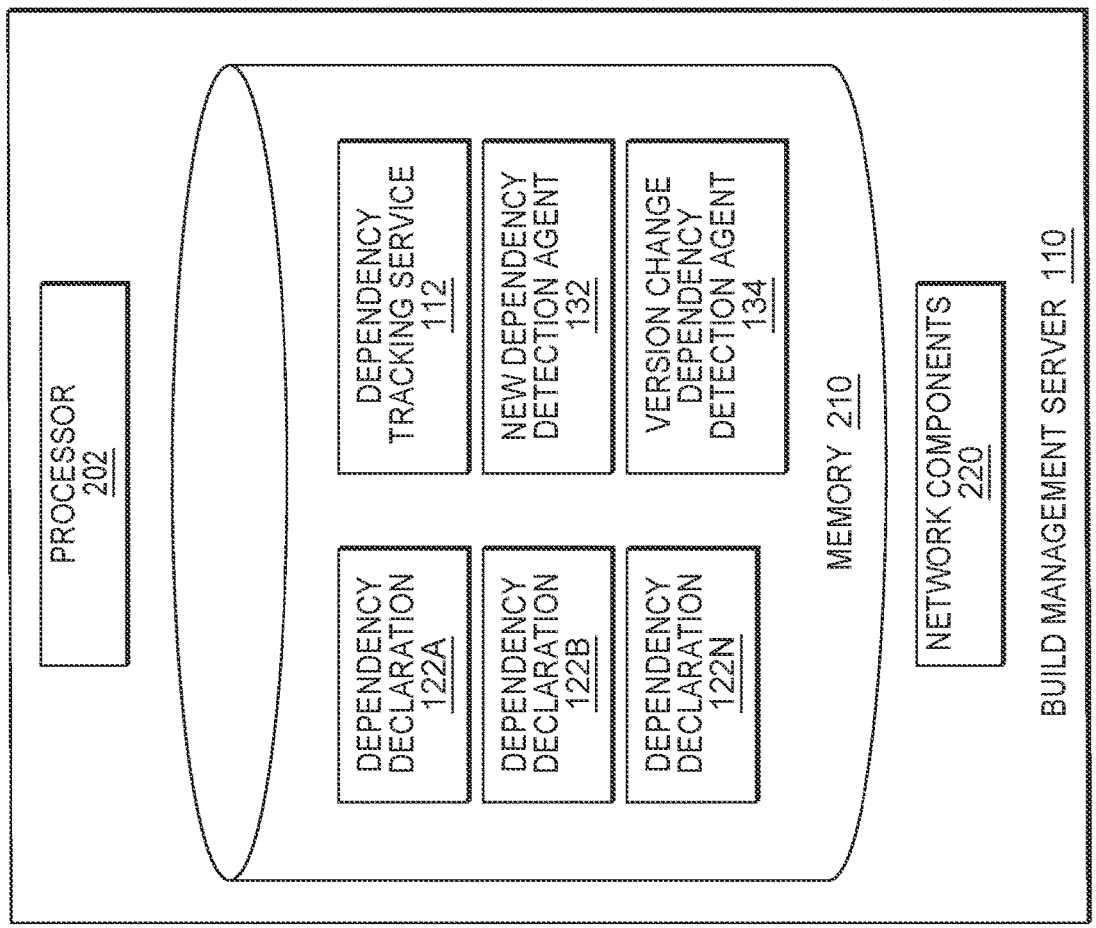
FIG. 2 illustrates a build controller for identifying and resolving security vulnerabilities in a software application build, according to one embodiment.

FIG. 2 illustrates a build management server 110 for identifying and resolving security vulnerabilities in a software application build, according to one embodiment. The build management server 110 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the build management server 110 to interface with a suitable communication network (e.g., a communication network interconnecting various components of the environment 100 illustrated in FIG. 1, or interconnecting the environment 100 with other computing systems). For example, the network components 220 can include wired, Wi-Fi®, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 includes one or more dependency declarations 122A-N. As discussed above, the dependency declarations 122A-N can identify dependencies for an application build (e.g., by name and version). In an embodiment, the memory 210 can further include a source control repository (e.g., vulnerability tracking repository 120 illustrated in FIG. 1, or any other suitable a source control repository).

The memory 210 further includes program code for performing various functions related to use of the build management server 110. The program code is generally described as various functional "applications" or "modules" within the memory 210, although alternate implementations may have different functions and/or combinations of functions. Within the memory 210, the dependency tracking service 112 facilitates new, or modified, dependencies included in an application build (e.g., the application build 102 illustrated in FIG. 1) and committing changes identifying the dependencies (e.g., dependency declarations 122A-N). Further, the new dependency detection agent 132 facilitates identifying vulnerabilities for new dependencies and the version change dependency detection agent 134 facilitates identifying vulnerabilities for new versions of dependencies. This is discussed further below with regard to FIGS. 3-5.

As discussed above, while the build management server 110 is illustrated as a single entity, in an embodiment, the various components can be implemented using any suitable combination of physical services, cloud compute nodes and storage locations, or any other suitable implementation. For example, the build management server 110 could be implemented using a server or cluster of servers (e.g., maintained by the application developer). As another example, the build management server 110 can be implemented using a combination of compute nodes and storage locations in a suitable cloud environment. For example, one or more of the components of the build management server 110 can be implemented using a public cloud, a private cloud, a hybrid cloud, on premises cluster, or any other suitable implementation.

Further, although FIG. 2 depicts the services 112, 132, and 134, and the dependency declarations 122A-N as being respectively located in the memory 210, that representation is also merely provided as an illustration for clarity. More generally, the build management server 110 may include one or more computing platforms, such as computer servers for example, which may be co-located, or may form an interactively linked but distributed system, such as a cloud-based system. As a result, processor 202, and memory 210, may correspond to distributed processor and memory resources within the computing environment 100. Thus, it is to be understood that any, or all, of the services 112, 132, and 134, and the dependency declarations 122A-N, may be stored remotely from one another within the distributed memory resources of the computing environment 100.

Figure 3:
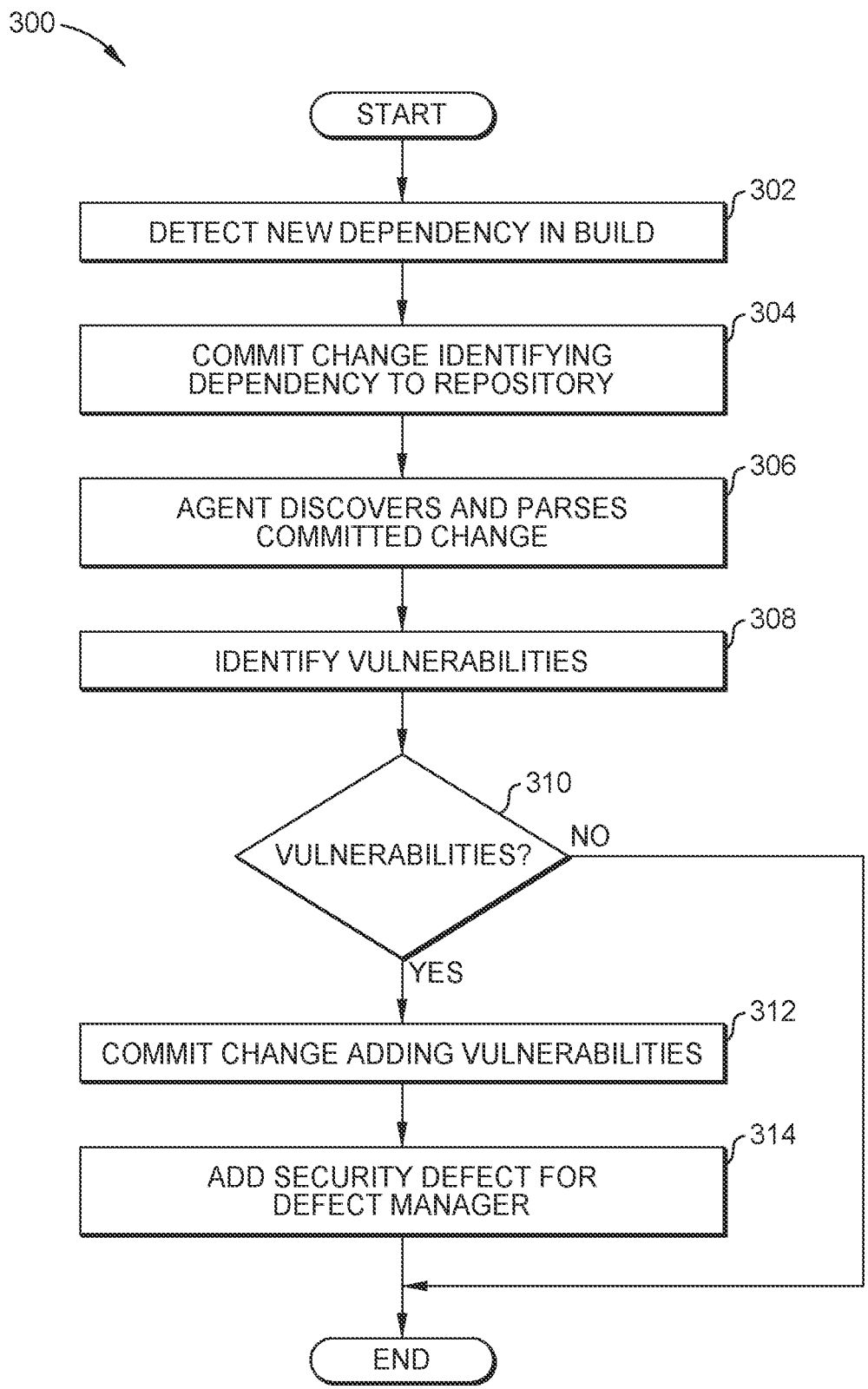
FIG. 3 is a flowchart illustrating identifying and resolving security vulnerabilities for a new dependency in a software application build, according to one embodiment.

FIG. 3 is a flowchart 300 illustrating identifying and resolving security vulnerabilities for a new dependency in a software application build, according to one embodiment. At block 302, a dependency tracking service (e.g., the dependency tracking service 112 illustrated in FIGS. 1-2) detects a new dependency added to a build. For example, the dependency tracking service receives a commit (e.g., the commit 104 illustrated in FIG. 1) relating to an application build (e.g., the application build 102 illustrated in FIG. 1). The dependency tracking service can identify added dependencies in the commit (e.g., scanning modified or new build files, reviewing changes in the commit, or using any other suitable technique).

At block 304, the dependency tracking service commits a change identifying the dependency to a repository. In an embodiment, the dependency tracking service commits the change as a declaration to a vulnerability tracking repository. For example, the dependency tracking service can commit a change to a source control repository configured to track dependency vulnerabilities (e.g., the vulnerability tracking repository 120 illustrated in FIG. 1) with a new dependency declaration (e.g., a dependency declaration 122A-N illustrated in FIGS. 1-2). This is merely on example, and the dependency tracking service can commit the change to any suitable repository (e.g., a different source control repository or another repository).

In an embodiment, the new dependency declaration identifies the new dependency. For example, the new dependency declaration can be a file added to the vulnerability tracking repository, and can include a name and version number for the new dependency. This is merely one example, and the dependency declaration can take any suitable form (e.g., an additional declaration to an existing file) include any suitable information (e.g., an identifier, a uniform resource locator (URL) or other Internet address, or any other identifying information).

At block 306 an agent discovers and parses the committed change. For example, a detection agent (e.g., the new dependency detection agent 132 illustrated in FIGS. 1-2) can listen for commits to the vulnerability tracking repository.

The detection agent can identify a new dependency added to the vulnerability tracking repository. For example, the detection agent can identify a new file added to the vulnerability tracking repository, or an addition to an existing file in the vulnerability tracking repository. These are merely examples.

The detection agent can parse the change to identify the new dependency. For example, the detection agent can parse the added file to identify the name and version number of the new dependency. Alternatively, or in addition, the detection agent can parse an existing file to identify a newly added dependency. These are merely examples.

At block 308, the detection agent identifies vulnerabilities. In an embodiment, the detection agent contacts a central repository (e.g., the vulnerability repository 140) to identify any vulnerabilities associated with the newly added dependency. For example, the detection agent can contact the NVD and provide the name and version number of the new dependency. The NVD can respond by identifying any known vulnerabilities for that dependency.

At block 310, the detection agent determines whether there were any vulnerabilities. If not, the flow ends. If yes, the flow proceeds to block 312.

At block 312, the detection agent commits a change adding the vulnerabilities. For example, the detection agent can modify the dependency declaration in the vulnerability tracking repository to add identifying information for the vulnerability. This can include, for example, an identifier, a short description, a link (e.g., an Internet address) to further details on the vulnerability, or any other suitable information. Alternatively, or in addition, the detection agent adds a new entry to the vulnerability tracking repository describing the vulnerability, adds a new entry to another repository describing the repository, or takes any other suitable action.

At block 314, the detection agent adds a security defect for a defect manager. For example, the detection agent can add an entry to a security tracking database identifying the vulnerability. A defect manager service (e.g., the defect manager service 150 illustrated in FIG. 1) can listen for added security defects, and can take action to cure the defect. For example, the defect manager service can automatically identify and retrieve a newer version of the dependency. As another example, the defect manager service can trigger an alert or warning for an engineer or administrator identifying the security defect, to enable the engineer or administrator to take steps to cure the security defect.

Figure 4:
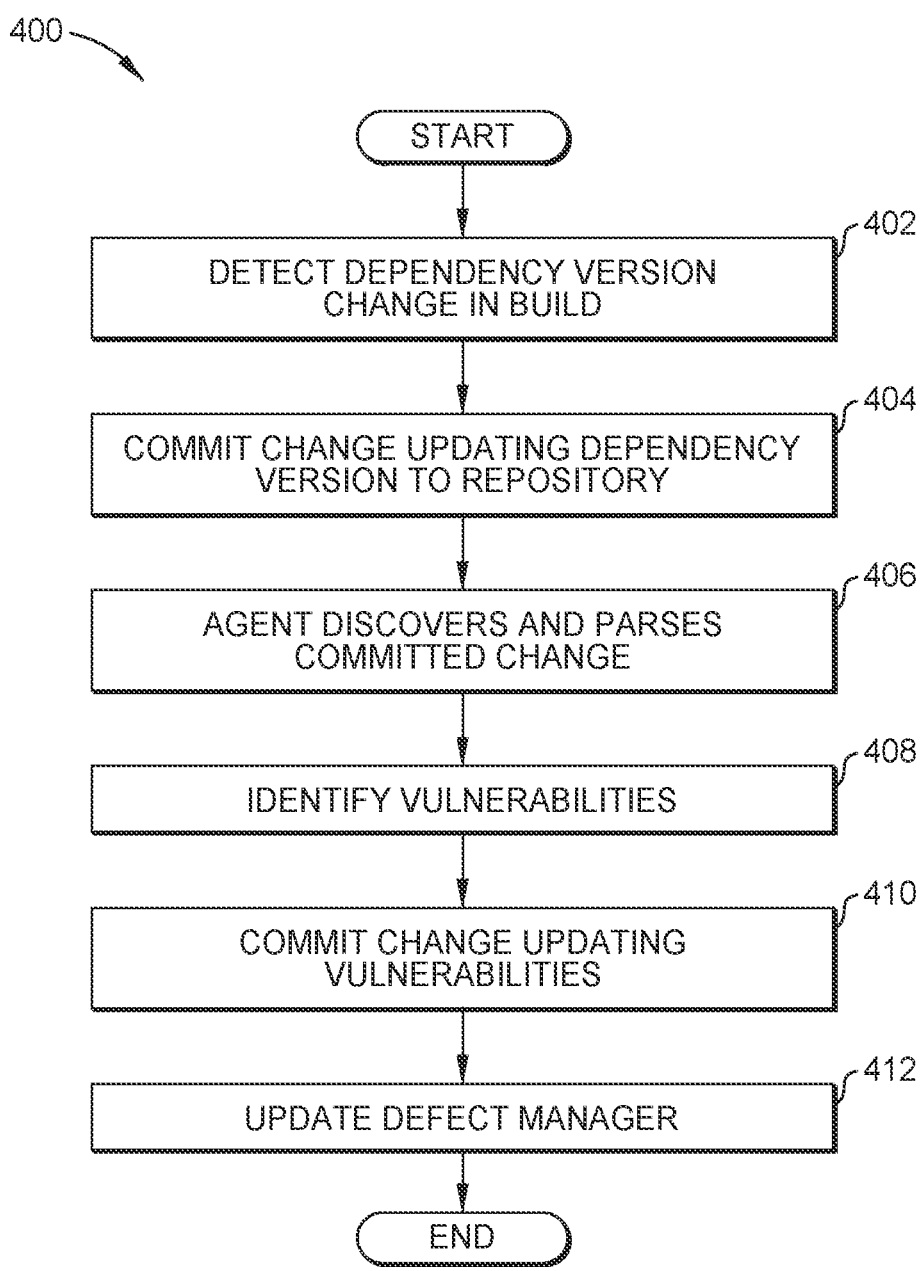
FIG. 4 is a flowchart illustrating identifying and resolving security vulnerabilities for a new version of a dependency in a software application build, according to one embodiment.

FIG. 4 is a flowchart 400 illustrating identifying and resolving security vulnerabilities for a new version of a dependency in a software application build, according to one embodiment. At block 402, a dependency tracking service (e.g., the dependency tracking service 112 illustrated in FIGS. 1-2) detects a dependency version change for a build. For example, the dependency tracking service receives a commit (e.g., the commit 104 illustrated in FIG. 1) relating to an application build (e.g., the application build 102 illustrated in FIG. 1).

In an embodiment, the dependency tracking service can identify dependencies with version changes in the commit (e.g., scanning modified or new build files, reviewing changes in the commit, or using any other suitable technique). For example, the dependency tracking service can analyze dependencies modified by the commit, and compare version numbers of the dependencies with a prior record of dependency version numbers. This is merely one example, and any suitable technique can be used.

At block 404, the dependency tracking service commits a change identifying the new dependency version to a repository. In an embodiment, the dependency tracking service commits the change as a declaration to a vulnerability tracking repository. For example, the dependency tracking service can commit a change to a source control repository configured to track dependency vulnerabilities (e.g., the vulnerability tracking repository 120 illustrated in FIG. 1) with an updated dependency declaration (e.g., a dependency declaration 122A-N illustrated in FIGS. 1-2). This is merely on example, and the dependency tracking service can commit the change to any suitable repository (e.g., a different source control repository or another repository).

In an embodiment, the new dependency declaration identifies the new version of the dependency. For example, the dependency declaration can be a file in the vulnerability tracking repository, and can include a name and version number for the dependency. The dependency tracking service can update the version information for the dependency in the file. This is merely one example, and the dependency declaration can take any suitable form (e.g., an additional declaration to an existing file) include any suitable information (e.g., an identifier, a uniform resource locator (URL) or other Internet address, or any other identifying information).

At block 406 an agent discovers and parses the committed change. For example, a detection agent (e.g., the version change dependency detection agent 134 illustrated in FIGS. 1-2) can listen for commits to the vulnerability tracking repository. The detection agent can identify a dependency with a new version added to the vulnerability tracking repository. For example, the detection agent can identify a change to a file in the vulnerability tracking repository reflecting an updated version information, or an addition to an existing file in the vulnerability tracking repository reflecting the updated version information. These are merely examples.

The detection agent can parse the change to identify the new dependency version. For example, the detection agent can parse the added file to identify the name and new version number of the dependency. Alternatively, or in addition, the detection agent can parse an existing file to identify a dependency with a new version. These are merely examples.

At block 408, the detection agent identifies vulnerabilities. In an embodiment, the detection agent contacts a central repository (e.g., the vulnerability repository 140) to identify any vulnerabilities associated with the newly added dependency. For example, the detection agent can contact the NVD and provide the name and version number of the new dependency. The NVD can respond by identifying any known vulnerabilities for that dependency.

At block 410, the detection agent commits a change updating the vulnerabilities. In an embodiment, the detection agent identifies new vulnerabilities associated with the version of the dependency. The detection agent can modify the dependency declaration in the vulnerability tracking repository to add identifying information for the new vulnerability. This can include, for example, an identifier, a short description, a link (e.g., an Internet address) to further details on the vulnerability, or any other suitable information. Alternatively, or in addition, the detection agent adds a new entry to the vulnerability tracking repository describing the vulnerability, adds a new entry to another repository describing the repository, or takes any other suitable action.

Further, in an embodiment, the detection agent can remove any dependency declarations in the vulnerability tracking repository identifying vulnerabilities associated with a prior version of the dependency, and not associated with the new version of the dependency. For example, a dependency may have been updated to cure a security vulnerability. The vulnerability tracking repository can include a dependency declaration identifying the vulnerability for the prior version of the dependency. The detection agent can remove this dependency declaration because the dependency has been updated.

In an embodiment, multiple aspects of an application build can rely on a same dependency (e.g., a same library). In this example, the detection agent can remove the identified vulnerability for a dependency only when every aspect of the application build has been modified to use an updated version of the dependency that cures the vulnerability. For example, the dependency declaration can identify each aspect of the build that uses the dependency (e.g., each build file or source code file), and can remove the identified vulnerability for the dependency only when all aspects have been updated. This ensures that the security vulnerability remains identified, so long as any aspect of the build uses a version of the dependency with the vulnerability.

At block 412, the detection agent updates the security defect for a defect manager. For example, the detection agent can add an entry to a security tracking database identifying the vulnerability. A defect manager service (e.g., the defect manager service 150 illustrated in FIG. 1) can listen for added security defects, and can take action to cure the defect. For example, the defect manager service can automatically identify and retrieve a newer version of the dependency. As another example, the defect manager service can trigger an alert or warning for an engineer or administrator identifying the security defect, to enable the engineer or administrator to take steps to cure the security defect.

In an embodiment, the detection agent can further remove entries from a security tracking database relating to vulnerabilities associated with a prior version of the dependency, and not associated with the new version of the dependency. Further, as discussed above in relation to 410, the detection agent can track multiple aspects of the build that rely on the same dependency, and can remove an entry from the security tracking database only when all aspects of the build rely on the updated version of the dependency (and not the prior version with the security vulnerability).

Figure 5:
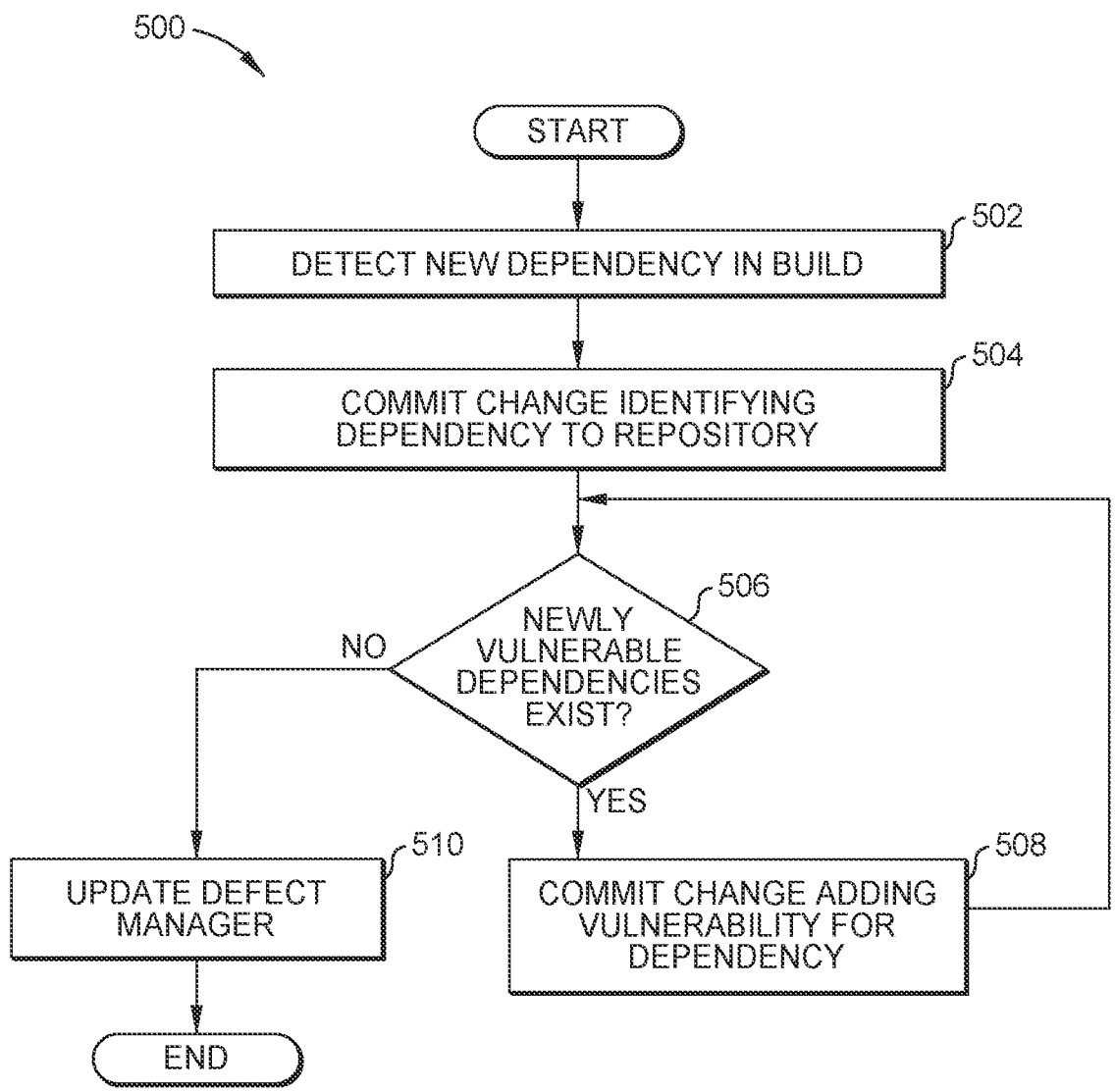
FIG. 5 is a flowchart illustrating identifying and resolving newly discovered security vulnerabilities for a software application build, according to one embodiment.

FIG. 5 is a flowchart 500 illustrating identifying and resolving newly discovered security vulnerabilities for a software application build, according to one embodiment. At block 502 a detection agent (e.g., the new dependency detection agent 132 or the version change dependency detection agent 134, both illustrated in FIGS. 1-2) receives a vulnerability update from a repository. For example, a central repository (e.g., the vulnerability repository 140 illustrated in FIG. 1) can track vulnerabilities in dependencies. The central repository can notify the detection agent of newly discovered vulnerabilities (e.g., by providing a feed of new vulnerabilities).

At block 504, the detection agent identifies corresponding dependencies. For example, the detection agent can receive a new vulnerability notification identifying a dependency with a vulnerability (e.g., identifying the name and version number of the dependency). The detection agent can review entries in a vulnerability tracking repository (e.g., the dependency declarations 122A-N illustrated in FIGS. 1-2), and identify any dependencies with the newly identified vulnerability. For example, the detection agent can match dependency names and version numbers between the newly identified dependency and the dependency declarations.

At block 506, the detection agent determines whether newly vulnerable dependencies exist. If so, the flow proceeds to block 508.

At block 508, the detection agent commits a change adding the vulnerability for the dependency. For example, the detection agent can modify the dependency declaration in the vulnerability tracking repository to add identifying information for the vulnerability. This can include, for example, an identifier, a short description, a link (e.g., an Internet address) to further details on the vulnerability, or any other suitable information. Alternatively, or in addition, the detection agent adds a new entry to the vulnerability tracking repository describing the vulnerability, adds a new entry to another repository describing the repository, or takes any other suitable action. The flow then returns to block 506, and the detection agent determines whether additional newly vulnerable dependencies exist.

Returning to block 506, once the detection agent determines that no newly vulnerable dependencies exist, the flow proceeds to block 510. At block 510, the detection agent updates a defect manager. For example, the detection agent can add an entry to a security tracking database identifying the vulnerability. A defect manager service (e.g., the defect manager service 150 illustrated in FIG. 1) can listen for added security defects, and can take action to cure the defect. For example, the defect manager service can automatically identify and retrieve a newer version of the dependency. As another example, the defect manager service can trigger an alert or warning for an engineer or administrator identifying the security defect, to enable the engineer or administrator to take steps to cure the security defect.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
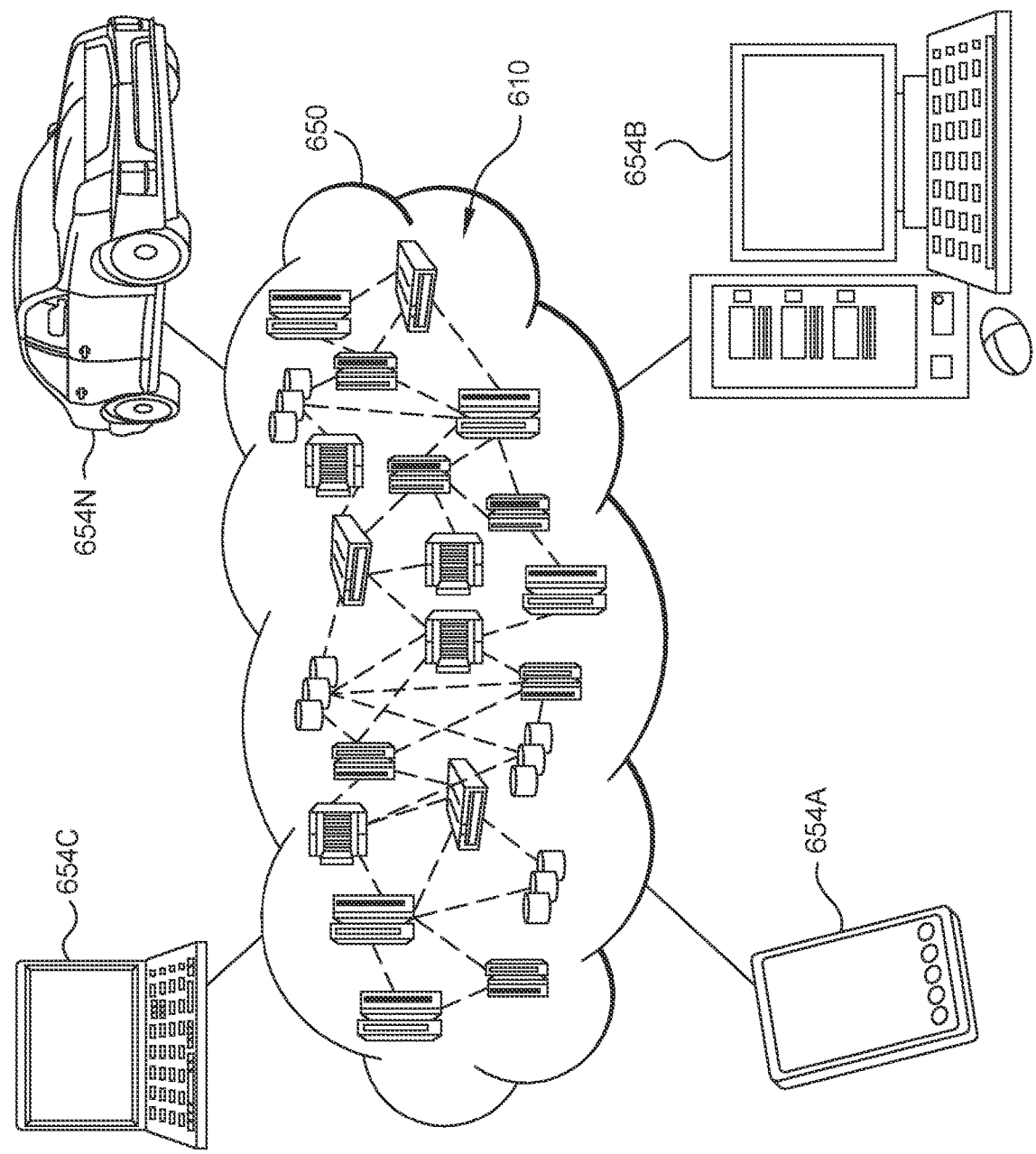
FIG. 6 depicts a cloud computing environment, according to one embodiment.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
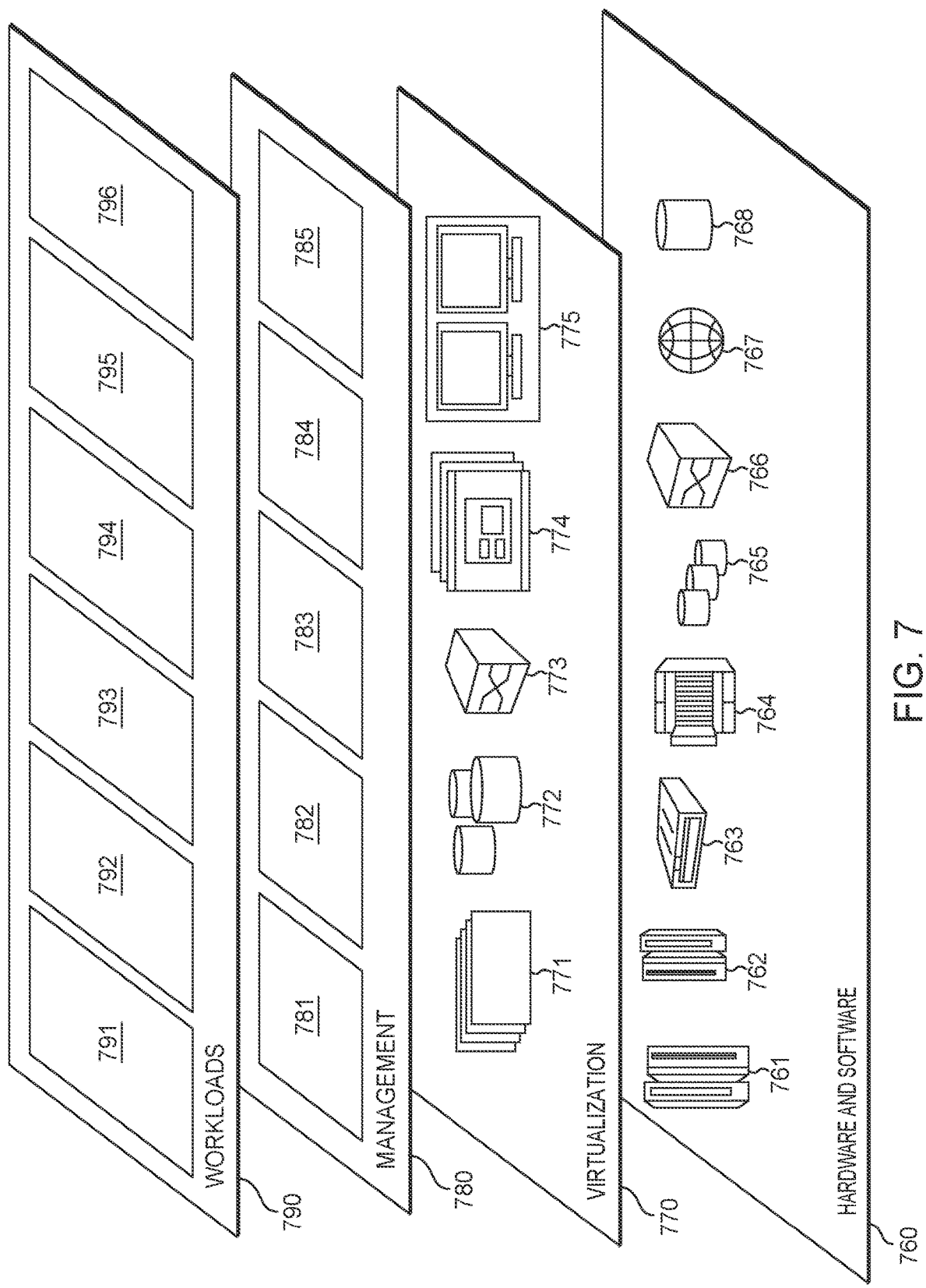
FIG. 7 depicts abstraction model layers, according to one embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and build management 796 (e.g., implementing one or more aspects of the build management server 110 illustrated in FIG. 1, including any, or all, of the dependency tracking service 112, the new dependency detection agent 132, and the version change dependency detection agent 134).

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   initiating a first detection agent to listen for dependency changes when a software application build is committed to a first source control repository;
   identifying, using the first detection agent, each commit to the first source control repository for the software application build as each commit occurs for the software application build;
   in response to each commit, triggering identification of a change for a dependency in the software application build based on analyzing each commit to the first source control repository for the software application build;
   storing an entry in the first source control repository reflecting an identification of the change for the dependency for each commit;
   parsing the entry in the first source control repository for each commit to identify the change for the dependency;
   determining that the change reflects a security vulnerability for a vulnerable version of the dependency, and in response:
      updating the first source control repository to identify the security vulnerability; and
      performing an action to cure the security vulnerability for the software application build comprising:
         automatically identifying, by a second detection agent, a new version of the dependency that cures the security vulnerability from a repository of known security vulnerabilities;
         automatically receiving, using a defect manager service, the new version of the dependency; and
         automatically updating, using the defect manager service, the software application build to include the new version of the dependency.

2. The method of claim 1, wherein identification of the change for the dependency in the software application build based on analyzing each commit to the first source control repository for the software application build further comprises at least one of:
   identifying a newly added dependency for the software application build, based on analyzing each commit, or
   identifying a new version for a previously existing dependency for the software application build, based on analyzing each commit.

3. The method of claim 2, wherein storing the entry in the first source control repository reflecting the change for the dependency for each commit further comprises:
   storing a dependency declaration identifying characteristics of the newly added dependency or the new version of the previously existing dependency in the first source control repository.

4. The method of claim 3, wherein updating the first source control repository to identify the security vulnerability further comprises:
   updating the dependency declaration to describe the security vulnerability.

5. The method of claim 4, wherein performing the action to cure the security vulnerability further comprises identifying the security vulnerability based on parsing the dependency declaration in the first source control repository.

6. The method of claim 4, wherein performing the action to cure the security vulnerability further comprises:
   identifying the security vulnerability based on parsing the dependency declaration in the first source control repository; and
   generating a notification to cure the security vulnerability.

7. A system, comprising:
   a computer processor; and
   a memory having instructions stored thereon which, when executed on the computer processor, performs operations comprising:
   initiating a first detection agent to listen for dependency changes when a software application build is committed to a first source control repository;
   identifying, using the first detection agent, each commit to the first source control repository for the software application build as each commit occurs for the software application build;
   in response to each commit, triggering identification of a change for a dependency in the software application build based on analyzing each commit to the first source control repository for the software application build;
   storing an entry in the first source control repository reflecting an identification of the change for the dependency for each commit;
   parsing the entry in the first source control repository for each commit to identify the change for the dependency;
   determining that the change reflects a security vulnerability for a vulnerable version of the dependency, and in response:
      updating the first source control repository to identify the security vulnerability; and performing an action to cure the security vulnerability for the software application build comprising:
automatically identifying, by a second detection agent, a new version of the dependency that cures the security vulnerability from a repository of known security vulnerabilities;
automatically receiving, using a defect manager service, the new version of the dependency; and
automatically updating, using the defect manager service, the software application build to include the new version of the dependency.

8. The system of claim 7, wherein identification of the change for the dependency in the software application build based on analyzing each commit to the first source control repository for the software application build further comprises at least one of:
identifying a newly added dependency for the software application build, based on analyzing each commit, or
identifying a new version for a previously existing dependency for the software application build, based on analyzing each commit.

9. The system of claim 8,
wherein storing the entry in the first source control repository reflecting the change for the dependency for each commit further comprises storing a dependency declaration identifying characteristics of the dependency in the first source control repository, and
wherein updating the first source control repository to identify the security vulnerability further comprises updating the dependency declaration to describe the security vulnerability.

10. The system of claim 9, wherein performing the action to cure the security vulnerability further comprises:
identifying the security vulnerability based on parsing the dependency declaration in the first source control repository.

11. A computer program product, comprising:
a computer-readable storage medium having computer-readable program code embodied therewith, the computer-readable program code executable by one or more computer processors to perform operations comprising:
initiating a first detection agent to listen for dependency changes when a software application build is committed to a first source control repository;
identifying, using the first detection agent, each commit to the first source control repository for the software application build as each commit occurs for the software application build;
in response to each commit, triggering identification of a change for a dependency in the software application build based on analyzing each commit to the first source control repository for the software application build;
storing an entry in the first source control repository reflecting an identification of the change for the dependency for each commit;
parsing the entry in the first source control repository for each commit to identify the change for the dependency;
determining that the change reflects a security vulnerability for a vulnerable version of the dependency, and in response:
updating the first source control repository to identify the security vulnerability; and
performing an action to cure the security vulnerability for the software application build comprising:
automatically identifying, by a second detection agent, a new version of the dependency that cures the security vulnerability from a repository of known security vulnerabilities;
automatically receiving, using a defect manager service, the new version of the dependency; and
automatically updating, using the defect manager service, the software application build to include the new version of the dependency.

12. The computer program product of claim 11, wherein identification of the change for the dependency in the software application build based on analyzing each commit to the first source control repository for the software application build further comprises at least one of:
identifying a newly added dependency for the software application build, based on analyzing each commit, or
identifying a new version for a previously existing dependency for the software application build, based on analyzing each commit.

13. The computer program product of claim 12,
wherein storing the entry in the first source control repository reflecting the change for the dependency for each commit further comprises storing a dependency declaration identifying characteristics of the dependency in the first source control repository, and
wherein updating the first source control repository to identify the security vulnerability further comprises updating the dependency declaration to describe the security vulnerability.

14. The computer program product of claim 13, wherein performing the action to cure the security vulnerability further comprises:
identifying the security vulnerability based on parsing the dependency declaration in the first source control repository.

* * * * *